United States Patent Office 3,647,885
Patented Mar. 7, 1972

3,647,885
PROCESS FOR THE PRODUCTION OF PHENOL SULFIDES
Emil J. Geering, Grand Island, and George B. Stratton, Lewiston, N.Y., assignors to Hooker Chemical Corporation, Niagara Falls, N.Y.
No Drawing. Continuation-in-part of application Ser. No. 666,915, Sept. 11, 1967, which is a continuation-in-part of application Ser. No. 597,228, Nov. 28, 1966. This application Dec. 30, 1968, Ser. No. 788,082
Int. Cl. C07c 149/36
U.S. Cl. 260—608
6 Claims

ABSTRACT OF THE DISCLOSURE

Producing phenol sulfides by reducing a phenol-sulfide produced by reacting elemental sulfur and a phenolic reactant in the presence of a basic catalyst and carrying the reaction to a degree of completion at which the maximum number of moles of hydrogen sulfide evolved is up to about 33 percent of the number of moles of sulfur charged to said reaction, and a process for converting the phenol-sulfides to mercaptophenols.

---

This application is a continuation-in-part of application S.N. 666,915, filed on Sept. 11, 1967 now U.S. Pat. 3,468,961 issued on Sept. 23, 1969. Application S.N. 666,915 is a continuation-in-part of application S.N. 597,228, filed on Nov. 28, 1966, now abandoned.

This invention is a novel process for preparing phenol sulfides and for converting these to mercaptophenols, preferably o-mercaptophenols. The reaction between a phenol and sulfur as effected by a basic catalyst is interrupted before completion and the product, a phenol sulfide mixture, is reduced to mercaptophenol. A step may be included in the mercaptophenol process whereby by-product phenol monosulfide is converted by hydrogenolysis back to phenol.

L. Haitinger in 1883, Monatsh Chem., 4, 165–175, prepared o-mercaptophenol. He obtained a phenol sulfide by heating a mixture of sodium phenate and sulfur. Apparently a minor portion of the acidified reaction mixture was collected as a steam distillate and contained the ortho isomer of mercaptophenol, for after neutralization and exposure to air the distillate deposited a salt of o,o'-dithiodiphenol, the oxidation product of o-mercaptophenol.

A process for production of mercaptophenol is disclosed in U.S. Pat. 2,004,728, K. W. Palmer, June 11, 1935, wherein a mixture of sodium phenate and sodium disulfide is heated. The product was isolated by solvent extraction of the acidified mixture. No yields were recorded and no physical properties other than a description of the product as a greenish oil were given. These procedures were described by D. Greenwood and H. A. Stevenson, J. Chem. Soc., 1953, 1514–1519, as giving poor yields of a product that was difficult to purify. Their method of choice was a modification of a procedure described by P. Friedlander and F. Mauthner, Zeit. Farb. Text. Ind., 3, 333–337 (1904) which, in turn, was based on the work of R. Leuckart, J. Prakt. Chem., 41, 179–224 (1890), whereby o-hydroxyphenyl ethyl xanthate, from o-hydroxybenzene diazonium chloride and potassium ethyl xanthate, is converted to o-mercaptophenol. The prior art is in sharp contrast, therefore, to the present invention. Here, o-mercaptophenol of high purity is produced from low-cost starting materials by a straight-forward procedure and in high yield.

Although at least part of Haitinger's product was ortho substituted phenol sulfide, more recent authors (C. Leferrer and C. Desgrez, Compt. Rend., 198, 1432–4, 1791–3 (1934)) reported the preparation of both p,p'-thiobisphenol and p,p'-dithiobisphenol by the base-catalyzed reaction of phenol and sulfur.

Phenol sulfides can also be produced by the reaction of phenol and sulfur monochloride or dichloride. These are primarily para substituted. This is demonstrated by several references in the literature in which the preparation of bis(p-hydroxyphenyl) sulfides by this route was reported. See, for example, Z. S. Ariyan and L. A. Wiles, J. Chem. Soc. 1962, 3876. The predominant sulfur bend in these phenols sulfides is the monosulfide. A phenol-sulfur chloride process patented by W. Hahn and K. Goliasch, U.S. Pat. 3,275,694, Sept. 27, 1964, gives phenol polysulfides but requires the use of hydrogen sulfide as a second sulfur-containing reagent.

The base-catalyzed condensation is effected with elemental sulfur, the number of sulfur atoms can range from one to about seven. When prepared under the conditions of this invention, the phenol sulfides have an average of at least two sulfur atoms per linkage.

The prior art processes employing sulfur chlorides has a disadvantage of requiring additionally an extra step, i.e., a sulfur chlorination step to produce sulfur chlorides as well as a step for disposing of a corrosive by-product gas, hydrogen chloride. Further, the employment of a sulfur halide as a reactant, in the reaction with phenol, often results in chlorinated by-products.

A further problem with the sulfur chloride reactant is the formation of a large yield of phenol monosulfide which is not directly reducible to the desired mercaptophenol. Finally, as the phenol-sulfur chloride product is para substituted, this route to mercaptophenol does not give the preferred o-mercaptophenol.

It is an object of this invention to avoid undesirable and complicating problems of known methods for the production of phenolic sulfides and mercaptophenols.

It is an object of this invention to produce an ortho-substituted mercaptophenol reaction product.

It is an object of this invention to obtain a process for the production of high yields of mercaptophenol reaction product.

Another object is to produce a high purity ortho-substituted phenolic sulfide having a high concentration of di- and/or polythio linkages.

Other objects become apparent from the above and the following disclosure.

In accordance with the present invention there is provided a process for the preparation of phenol sulfide mixtures and for converting these to mercaptophenols comprising reacting sulfur with a phenolic reagent wherein about 0.3 to about three moles of phenolic reactant are used per mole of sulfur, at a temperature of about 100 degrees centigrade to about 200 degrees centigrade, for a period of time of at least one hour to about 30 hours in the presence of a basic catalyst in a molar amount ranging from at least a catalytic amount up to about 15 percent based on the number of moles of said phenolic reactant, interrupting said reaction before the number of moles of hydrogen sulfide evolved exceed about 33 percent of the number of moles of sulfur charged into said reaction, thereby producing phenol sulfides having at least 60 percent of their sulfur linkages located ortho to at least one hydroxyl group per phenolic ring and having one to about seven sulfur atoms per linkage connecting each of a pair of hydroxy-substituted rings of said phenol sulfides but averaging at least two sulfur atoms per linkage, reacting said phenol sulfides with a reducing agent to produce a mercaptophenol leaving by-product phenol monosulfide uncharged, wherein at least 60 percent of the mercaptan groups of said mercaptophenol are substituted ortho to hydroxyl groups, wherein after separating the by-product phenol monosulfide it is converted to the phenolic reagent and hydrogen sulfide. The phenolic reagent may be recycled into the process.

The reaction between a phenol and sulfur results in a phenol polysulfide product as illustrated by the following formula:

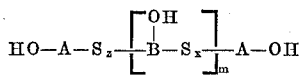

wherein A is independently selected from the group consisting of

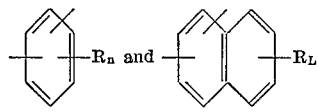

B is independently selected from the group consisting of

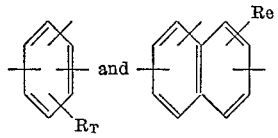

R is independently selected from the group consisting of: hydrogen; halogen; hydroxy; alkyl or alkoxy of 1 to 20 carbon atoms; aryloxy of 6 to 18 carbon atoms; cyclic alkyl of 3 to 20 carbon atoms; carboxy or carbalkoxy of 2 to 20 carbon atoms; carbaryloxy from 7 to 18 carbon atoms;

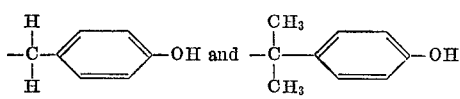

L=0 to 6; $m$ is a number from 0 to about 3; $n$=0 to 4; T=0 to 3; $e$=0 to 5; $z$ and $x$ are numbers from 1 to about 7 (normally up to about 4) provided that the average number of sulfur atoms equals at least about two sulfur atoms per sulfur linkage and provided that at least about 60 percent of sulfur-linkages are ortho to 1 hydroxy group per phenol ring.

Preferably R is selected from the group consisting of halogen, acyclic alkyl or alkoxy of 1 to about 18 carbon atoms, aryl, aryloxy, cyclic alkyl and hydroxy. Preferably A and B are phenyl or substituted phenyl.

The novel polythiobisphenols or phenol polysulfides of this invention produced from a phenol and sulfur in the presence of a basic catalyst have a special utility in that they are reducible to mercaptophenols. The phenolic rings are linked by a sulfur bond containing at least two sulfur atoms in order to be reducible to a mercaptophenol. The phenol sulfide molecules are reduced to mercaptophenol comprising at least about 60 percent orthomercaptophenol. In accordance with this invention a phenol and sulfur are heated in the presence of a basic catalyst until up to one-third of the sulfur has been expelled as hydrogen sulfide. As shown in the following equation when one-third of the sulfur has been converted to hydrogen sulfide, the average sulfur bond in the organic product is a disulfide bond.

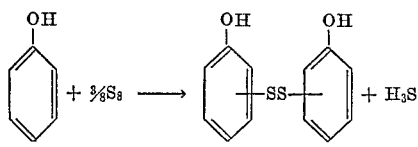

If the reaction is terminated when one-fourth of the sulfur is converted to hydrogen sulfide, the average sulfur bond will be a trisulfide. Similarly, one-fifth of the charged sulfur as hydrogen sulfide corresponds to a tetrathiobisphenol. These relationships are valid only when all of the charged sulfur has entered reaction. Although most of the sulfur may have been converted into polysulfide bonds, mainly disulfide bonds, when 33 percent of the sulfur has been evolved as hydrogen sulfide, the reaction if continued will continue to evolve hydrogen sulfide until the polysulfide bonds are converted, with loss of sulfur—which reacts again with phenol or the phenolic substrate, to monosulfide bonds.

When half of the charged sulfur is converted into hydrogen sulfide and half into monosulfide bonds, the maximum extent of reaction is reached.

In the following Table II of Example V through XI, the extent of reaction, as measured by the quantity of hydrogen sulfide generated, is listed as percent reaction for each example. The phenol sulfides of this invention may typically be employed as either stabilizers or as vulcanizing agents or both, in rubber such as butadiene-styrene of butadiene-acrylonitrile, for example.

The phenols that can be used in this reaction include phenol; alkylphenols having one or more side chains up to about twenty carbon atoms, such as 2,4-dioctylphenol or dodecylphenol; chloro- or bromophenols, such as 2,4-dichlorophenol; arylphenols such as 4-benzylphenol or 4-phenylphenol; nitrophenols; hydroxyphenols such as catechol, alkoxy- or aryloxyphenols such as 2-methoxy or 4-phenoxyphenol; carboxyphenols such as salicyclic acid as well as the corresponding ester, i.e., ethyl salicylate. Other suitable phenolic reagents are the naphthols and bisphenols typified by 4,4'-isopropylidenediphenol. The substituted phenolic reagents must have at least one ortho position substituted by hydrogen.

The molar ratio of the phenolic reagent to sulfur is from about 0.3 to about three, preferably said ratio is up to about two.

The reaction of the phenolic reactant with sulfur is carried out at a temperature from about 100 degrees centigrade to about 200 degrees centigrade for a period from at least one hour to about 30 or more hours provided that said reaction is carried to a degree of completion at which the maximum number of moles evolved of hydrogen sulfide is no more than about 33 percent of the number of moles of sulfur charged into said reaction. Preferably the reaction is carried out at a temperature of about 140° to 180°.

The basic catalysts which may be employed in the initial condensation reaction include elemental alkali and alkaline metals, alkali or alkaline earth hydroxides, primary, secondary and tertiary amines, salts of strong bases and weak acids or alcohols, such as sodium acetate, sodium benzoate, sodium methylate, sodium sulfhydrate, aluminum isopropoxide, sodium thiosulfate, sodium sulfide, sodium tetrasulfide, sodium thiocyanate, and the like. Other typical suitable catalysts include sodium, potassium, lithium, calcium and barium hydroxides; methyl, dimethyl, triethyl, and tripropyl amines and the like.

The selectivity of the reaction of phenol and sulfur in giving ortho-substituted product is dependent on the concentration of the basic catalyst; as catalyst concentration is reduced the proportion of ortho-substituted product increases.

In the preferred process a catalyst level of from a catalytic amount up to substantially less than two percent, preferably up to 0.2 percent (on a molar basis of the phenol) is employed to obtain more than about 90 percent of the ortho-phenol sulfide of this invention, or alternatively a preferred catalyst level of from about 10 percent up to about 15 percent to obtain up to about 30 percent of the para-phenol sulfide; sodium hydroxide, sodium phenate, sodium sulfide, and sodium polysulfide are the preferred catalysts.

In the preferred embodiment the period of reaction is from about two to about 15 hours at 140° to 180° C. when the phenolic reactant is phenol and the catalyst level is less than two mole percent. However, for the about 10 percent to 15 percent catalyst level, the preferred period of reaction is about 0.5 hour to about 5 hours, at preferably about 100° C. to about 150° C. The phenol sulfide of this invention is about 90 percent or more "ortho" substituted when catalyst employed is less than about 0.2 percent, and may be typically represented as follows:

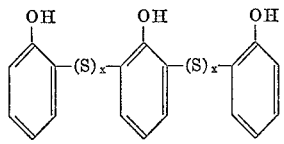

wherein $x$ averages at least two.

However, at higher catalyst levels the typical structure may be partially "para," such as follows, for example:

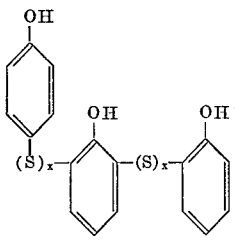

Distillation is employed to remove at least a portion of the unreacted phenol from the reaction product. Distillation pressure is preferably in the range of about 0.01 mm. Hg to atmospheric pressure or higher. If, because of insufficiently reduced pressure, the temperature of the distillation residue will approach, during the distillation, reaction temperature, the reaction mixture should be neutralized, for example, with hydrochloric acid, prior to the distillation step.

When the phenol sulfide product of this invention is reduced to a mercaptophenol at least 60 percent of the mercaptan groups of the mercaptophenol so obtained are located ortho to an hydroxy group. As the concentration of basic catalyst used in the condensation of sulfur and the phenolic reagent is decreased, the proportions of ortho-mercaptophenol increases. In the preferred process a catalyst level of from a catalytic amount up to substantially less than two percent, preferably up to 0.2 percent (on a molar basis of the phenol) is employed to obtain a phenol sulfide mixture which on reduction gives a mercaptophenol which is more than about 90 percent of an ortho mercaptophenol. Alternatively a preferred catalyst level of from about 10 percent to 15 percent is employed to obtain a mercaptophenol which is up to about 30 percent of a paramercaptophenol.

The reduction to the mercaptophenols can be effected by several well-known methods. These typically include the action of metals and acid (nascent hydrogen), catalytic hydrogenation, and chemical reduction using alkali metal sulfides, for example. The preferred process is by hydrogenation.

Alkali metal sulfides reduce disulfides according to the equation:

(1)    $RSSR + 2Na_2S \rightarrow 2RSNa + Na_2S_2$

The present invention makes use of the reaction of sulfur, present primarily as alkali or organic polysulfide, and caustic to generate the sodium sulfide required by the above equation.

(2)    $Na_2S_2 + 1.5NaOH \rightarrow 1.5Na_2S + 0.25Na_2S_2O_3 + 0.75H_2O$

According to Equation 3, sodium hydroxide or other alkali or alkaline earth hydroxide is the sole reagent required to effect reduction of the bis(o-hydroxyphenyl)-polysulfide.

(3)    $RSS_xSR + 1.5(1+x)NaOH \rightarrow 2RSNa + 0.25(1+x)Na_2S_2O_3 + 0.5(x-1)Na_2S + 0.75(1+x)H_2O$ In Equations 1 and 3, R is the o-hydroxyphenyl radical.

The free mercaptophenol is liberated from its salt, RSNa, by acidification. Sulfurous acid, as sulfur dioxide or alkali sulfite, is a preferred acid as detrimental side reactions (such a liberation of elemental sulfur, which may occur when strong acids are used) are avoided. The product mercaptophenol is conveniently collected by solvent extraction of the acidified reaction mixture. Butyl acetate or diethyl ether are suitable solvents.

The reduction of phenol sulfide, i.e., polysulfides, by catalytic hydrogenation is conducted under a hydrogen pressure of about 500 pounds per square inch to 3,000 p.s.i. or higher, at temperatures ranging from about 100 degrees centigrade to about 125 degrees centigrade. Solvents may be used, and are desirable when the intermediate melts at temperatures higher than about 125 degrees centigrade. The product mercaptophenol is generally recovered by distillation, after separating the hydrogenation catalyst from the reaction mixture.

Hydrogenation catalysts typically include sulfides of various metals, such as $CoS$, $CoS_3$, $Co_2S_3$, $MoS_3$, $MoS_4$ and the like, nickel poly-sulfide, iron poly-sulfide, chromium poly-sulfide, tungsten poly-sulfide, copper poly-sulfide, silver poly-sulfide, lead poly-sulfide, palladium sulfides and platinum sulfides, for example.

Typical mercaptophenols and yields thereof prepared by the process of this invention are disclosed in Table I.

TABLE I

| Mercaptophenol: | Percent yield |
|---|---|
| 2-mercaptophenol | 71 |
| 2-mercapto-4-methylphenol | 61 |
| 2-mercapto-4-t-butylphenol | 71 |
| 2-mercapto-6-t-butylphenol | 68 |
| 2-mercapto-4,6-di-t-butylphenol | 59 |

In the process of preparing the phenol sulfides of this invention some phenol monosulfide is formed. Further during distillation of a mercaptophenol, additional phenol monosulfide is formed as shown.

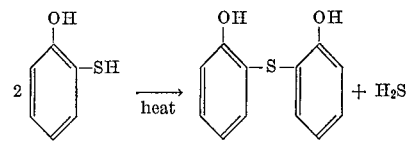

These by-product monosulfides can be converted back to phenol by hydrogenolysis as described in the following reaction formula

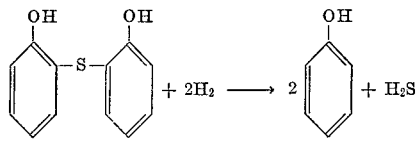

In the process for the production of mercaptophenols of the present invention, the yield of mercaptophenol, therefore, may be increased to substantially a quantitative yield by performing a hydrogenolysis step on the residue that remains after separating, e.g. by distillation, the product mercaptophenol from the hydrogenation reaction mixture and recycling the recovered phenol for further reaction with sulfur.

By heating the residue in the presence of a reduction catalyst and hydrogen at a pressure of from about 500 p.s.i. to about 3,000 p.s.i. or higher and at a temperature of from about 150 degrees centigrade to about 250 degrees centigrade, the residue is substantially converted to hydrogen sulfide and the phenolic starting compound that may be recycled. The catalysts that may be employed in the hydrogenolysis step are those described above as typical hydrogenation catalysts. The change in conditions in going from hydrogenation to hydrogenolysis is a relatively small temperature change of about 25 degrees or more.

Mercaptophenols are useful compounds because they have two functional groups attached to the aromatic ring. They are useful as chemical intermediates. They are also useful as polymerization modifiers. Metallic salts of ortho mercaptophenol may be used as stabilizers for plastics such as polyethylene or polyvinyl chloride. They render the plastic less amenable to degradation by light and heat.

EXAMPLE I

Preparation of o-mercaptophenol

Into a tared 5-liter flask, fitted with a stirrer, thermometer and condenser is charged 30 moles of phenol (2820 g.) and 1.5 g. of sodium hydroxide (0.125 mole percent of phenol). Heating of the solution to 150 degrees centigrade is started. At 120 degrees centigrade, 30 moles of sulfur flowers (sublimed sulfur) (960 g.) is added. The stirred reaction mixture is maintained at 150 degrees centigrade until 5.25 moles of hydrogen sulfide (178 g.) are evolved. (A plot of $H_2S$ versus time, prepared as the reaction progresses, is a good method of monitoring the reaction and of estimating its completion time. Hydrogen sulfide is conveniently measured by periodically weighing the reactor.)

After the required amount of $H_2S$ has been expelled, the unreacted phenol is distilled off at 10 mm. until a pot temperature of 140 degrees centigrade is reached. About 1900 g. of phenol will be collected. The residue of phenol sulfide weight 1700 g. and contains 46.5 percent sulfur.

EXAMPLE II

The product of Example I is transferred to a 12-liter flask fitted with a stirrer, gas inlet tube, thermometer and condenser. To the well-stirred residue is added 1560 grams of sodium hydroxide as a 33 percent solution.

The stirred nitrogen-purged basic solution is rapidly heated to 100 degrees centigrade, maintained at that temperature for 15 minutes and then rapidly cooled to 10–15 degrees centigrade. During the cooling process sufficient cold water to reduce the caustic concentration to 25 percent is added.

Next, after adding 500 ml. of sec-butyl acetate, the stirred cold solution is brought to a pH of 3 by passing in gaseous sulfur dioxide. The temperature is kept below 15 degrees centigrade during the acidification. The organic layer is separated and the aqueous layer is extracted with four 200 ml. portions of butyl acetate. The combined extracts are stripped of butyl acetate at aspirator vacuum to a pot temperature of 85 degrees centigrade. The residue is flash distilled at aspirator vacuum to give about 880 grams of crude product, about 70 percent yield. Further purification is effected by fractionating the flash distillate through a 10-plate Oldershaw column. The main cut is collected at 90°/15 mm., is greater than 98 percent and has a refractive index ($n_D^{25}$) of 1.6100 to 1.616.

Isomer distribution.—In the following Example III, 92.3 percent of the distilled reduction product is ortho-mercaptophenol, the remainder is para. In this Example III, the sulfur-phenol reaction is conducted in the presence of 0.125 mole percent, relative to phenol, of sodium hydroxide.

On the other hand, when the reaction is catalyzed by a larger proportion of base as in the following Example IV, where 12.5 mole percent of sodium hydroxide was used, the ortho and para percentages were 68 and 32 respectively.

EXAMPLE III

Preparation of o-mercaptophenols by hydrogenation

A stirred solution of 1880 g. of phenol (20 moles) 640 g. of sulfur flowers (20 moles) and 1.0 g. of sodium hydroxide is heated at 155 degrees centigrade until 119 g. of hydrogen sulfide is evolved. This required 4–15 hours. After neutralizing the reaction mixture with mineral acid, it is stripped of phenol, 1217 g. at 20 mm. to a body temperature of 140 degrees centigrade to leave a residue of 1173 g.

A portion of the residue, 500 g. is transferred, along with 33 g. of cobalt sulfide catalyst, to a one-liter stainless steel autoclave where it is stirred and heated at 125 degrees centigrade. After purging with hydrogen, the autoclave is put under 1,000–2,000 pounds per square inch of hydrogen pressure. As the hydrogenation proceeds, the autoclave is periodically repressurized. When the hydrogen uptake ceases the autoclave is vented to remove hydrogen sulfide and hydrogen.

After filtering off the catalyst, the crude product is distilled, with no column, to give 272 g. of crude distillate and 74 g. of residue. The crude distillate is fractionally distilled through a 16-inch Vigreux column to give 241 g. of o-mercaptophenol of 90–95 percent purity and 20 g. of p-mercaptophenol, which corresponds to a total yield of about 65 percent.

Fractionation of the crude distillate through a four-foot distillation column packed with glass helices gave o-mercaptophenol of 99 percent purity.

EXAMPLE IV

Phenol and sulfur reaction—increased catalyst level

A solution of 1800 g. (20 moles) of phenol, 640 g. of sulfur (20 moles) and 100 g. (2.5 moles) of sodium hydroxide is heated at 110–135 degrees centigrade until about 120 g. (3.5 moles) of hydrogen sulfide is evolved. This requires about one and one-half hours. The reaction mixture is neutralized with hydrochloric acid and then filtered to remove sodium chloride. The filtrate is stripped of 1345 g. of aqueous phenol containing 200 g. of water. The residue is hydrogenated at 125 degrees centigrade over cobalt sulfide catalyst under about 2,000 pounds of hydrogen pressure. This requires 19 hours. After separating the catalyst, the product is fractionally distilled to give 307 g. of o-mercaptophenol and 170 g. of p-mercaptophenol. The two isomers are produced in the ratio of 68 to 32 in a total yield of 54 percent.

EXAMPLES V THROUGH XI

Examples V through XI were conducted substantially the same as the initial condensation reactions of the preceding example, except that each was reacted for a period of twenty-seven hours. The reactants, the amounts thereof, the reaction temperature, the percent of reaction and the quantity of hydrogen sulfide evolved as percent of reaction and the quantity of hydrogen sulfide evolved as percent of charged sulfur are disclosed in the following Table II.

TABLE II

[Percent of phenol-sulfur reaction after twenty-seven hours

| | Catalyst | | | | | Ratio of sulfur | | |
|---|---|---|---|---|---|---|---|---|
| Example | Mole percent | Weight (g./mole of phenol) | Composition | ° C. | Mole ratio, phenol/sulfur | atoms to sulfur bonds | Percent of reaction | Hydrogen sulfur, percent of charged sulfur |
| V | 0.63 | 1.16 | $Na_2S_4$ | 155 | 0.45 | 4.3 | 38 | 19 |
| VI | 0.63 | 1.16 | $Na_2S_4$ | 170 | 0.44 | 2.9 | 51 | 26 |
| VII | 0.125 | 0.053 | NaOH | 150 | 1.0 | 3.7 | 43 | 22 |
| VIII | 0.5 | 0.213 | NaOH | 144–149 | 1.67 | 1.3 | 86 | 43 |
| IX | 0.5 | 0.213 | NaOH | 150 | 1.0 | 1.8 | 72 | 36 |
| X | 0.25 | 0.107 | NaOH | 150 | 1.0 | 2.3 | 61 | 31 |
| XI | 0.25 | 0.107 | NaOH | 155 | 0.5 | 5.2 | 32 | 16 |

Examples V and XI illustrate the comparable effectiveness of sodium hydroxide as a catalyst as compared with $Na_2S_4$. The effect of temperature is demonstrated by comparing Examples V and VI. Increasing the catalyst concentration will increase the extent of reaction, as shown in Examples VII and IX. The greater susceptibility of phenol as compared with the phenol-sulfur condensation product to reaction with sulfur is illustrated by the series of Examples VIII through XI where the ratio of phenol to sulfur in the reaction charge is changed. Increasing the ratio from 0.5 to 1.0 raises the hydrogen sulfide evolution from 16 to 31 percent of the charged sulfur. A further increase (at a different catalyst level) raises the hydrogen sulfide evolution from 36 to 43 percent.

EXAMPLES XII THROUGH XX

Examples XII through XX were each conducted substantially the same as Examples V through XI except for the changes disclosed in Table III.

Of the sulfide bonds, the monosulfide is the most stable as polysulfide bonds can be split by nucleophilic reagents. uncombined. In general, the number of chemically-bound sulfur atoms per polysulfide bond will be less than the numbers listed in Tables II and III under the heading, "Ratio of Sulfur Atoms to Sulfur Bonds."

TABLE III

[Atoms of sulfur in phenolic substrate per sulfur bond at 0.125 mole percent of NaOH]

| Example | ° C. | Hours of reaction | Mole ratio, phenol/sulfur | Ratio of sulfur atoms to sulfur bonds | Hydrogen sulfide, percent of charged sulfur | Percent of reaction |
|---|---|---|---|---|---|---|
| XII | 172–186 | 11 | 2.0 | 1.0 | 49 | 98 |
| XIII | 150–181 | 9 | 2.0 | 1.4 | 40 | 80 |
| XIV | 160 | 4 | 2.0 | 2.4 | 30 | 59 |
| XV | 161 | 3.5 | 2.0 | 3.1 | 25 | 50 |
| XVI | 155 | 200 | 1.0 | 1.2 | 45 | 90 |
| XVII | 155 | 27 | 1.0 | 2.6 | 28 | 56 |
| XVIII | 155 | 12 | 1.0 | 3.4 | 23 | 45 |
| XIX | 155 | 6 | 1.0 | 4.6 | 18 | 35 |
| XX | 155 | 3 | 1.0 | 6.3 | 14 | 27 |

EXAMPLE XXI

Reaction of chlorophenol and sulfur

An equimolar solution of o-chlorophenol and sulfur containing about three mole percent of NaOH with respect to phenol, is heated 15 hours at 170–175°. The extent of reaction as indicated by hydrogen sulfide evolution is 43 percent. However, only 19 percent of the chlorophenol reacts.

A similar experiment is conducted with p-chlorophenol. The data of these two experiments are compared with the corresponding results obtained with phenol in the following Table IV.

TABLE IV

[Comparison of reactivity of phenol and chlorophenols]

| Phenol | Catalyst | Mole percent | Hours | ° C. | Percent extent of reaction | Percent phenol conversion |
|---|---|---|---|---|---|---|
| o-Chloro | NaOH | 2.8 | 15 | 170–176 | 42.8 | 18.5 |
| p-Chloro | NaSH | 2.3 | 25 | 155–185 | 38.2 | 19.3 |
| Unsubstituted | NaOH | 0.13 | 10 | 155 | 42.8 | 45 |

The phenol-sulfur condensation product when prepared for use as an intermediate ortho-polyol for conversion to an aliphatic polyol by oxyalkylation, or to any epoxy resin therefore, should contain primarily monosulfide bonds. Monothiodiphenol, however, cannot be normally reduced to mercaptophenol. Therefore, to obtain the maximum yield of mercaptophenol, a phenol-sulfur condensation product having substantially no monosulfide bonds should be used.

These two alternative ends can be achieved by employing particular but different reaction conditions. The average number of sulfur atoms per sulfur bonds is shown in Examples XII through XX, illustrated in Table III for phenol-sulfur condensation products made under several conditions but all in the presence of 0.125 mole percent of relative to phenol, of sodium hydroxide. It should be noted that the higher temperatures and higher mole ratios of phenol to sulfur increase the yield of substantially mono-thio linkages. The phenol-sulfur condensation products usually contain unreacted sulfur. In general, the larger the percentage of sulfur in the product, the larger will be the quantity of free sulfur. In Example XII where the ratio of sulfur atoms to sulfur bonds is one, no free sulfur is present. On the other hand, in runs similar to Example XX, two to three sulfur atoms may be chemically At the same extent of reaction, 43 percent, almost 2½ times more phenol had been converted than o-chlorophenol. This demonstrates much lower reactivity of the chlorophenols as compared with phenol. Indeed, it is questionable if the reaction with chlorophenol proceeds in the same manner as with the more reactive phenols.

Vulcanizates prepared with butadiene-styrene or butadinene-acrylonitrile rubber, for example, and hydroxphenyl sulfides or alkyl hydroxyphenylene sulfides are generally superior in modulus, elongation, tensile strength, tear resistance, resistance to flex-crack growth and retention of original properties on aging. The sulfides also function as tackifiers for butadiene-styrene rubber. The following Example XXII illustrates the utility of the phenol sulfide as a vulcanizing and stabilizing agent.

EXAMPLE XXII

Samples of styrene-butadiene rubber were formulated with and without hydroxyphenylene polysulfide. After vulcanization several physical properties were determined. These properties were rechecked after an aging period at 100° C.

The vulcanizing and stabilizing action of the hydroxyphenylene polysulfide is illustrated by the date of the following Table V. The ratio of sulfur atoms to sulfur bonds of this hydroxyphenylene polysulfide was five.

TABLE V
[Evaluation of ortho hydroxyphenylene sulfide in SBR]

|  | Control |  | Test |  |
|---|---|---|---|---|
| Styrene-butadiene rubber (parts) | 100 |  | 100 |  |
| Carbon black | 40 |  | 40 |  |
| Processing oil | 10 |  | 10 |  |
| ZnO | 3 |  | 3 |  |
| Stearic acid | 2 |  | 2 |  |
| Sulfur | 2 |  |  |  |
| Accelerator | 1.2 |  | 1.2 |  |
| Hydroxyphenylene sulfide |  |  | 5 |  |
| Vulcanization time, min. 140° C | 10 | 20 | 10 | 20 |
| Hardness, shore $A_2$ | 65 | 65 | 67 | 67 |
| 300% modulus, p.s.i | 950 | 950 | 1,060 | 1,280 |
| Elongation, percent break | 630 | 590 | 630 | 580 |
| Tensile strength, p.s.i | 3,130 | 2,730 | 3,320 | 3,170 |
| Seven day aging, 100° C.: |  |  |  |  |
| Hardness, shore $A_2$ | 84 | 84 | 83 | 84 |
| Elongation, percent retention | 17 | 17 | 28 | 30 |
| Tensile strength, percent retention | 47 | 56 | 66 | 75 |

EXAMPLE XXIII

A phenol-sulfur condensation product was prepared by heating a solution of 7520 grams of phenol (80 moles), 1,280 grams of sulfur flowers (40 moles) and 9.0 grams of sodium hydroxide at a temperature of 180 to 185 degrees centigrade for about 20 hours. Unchanged phenol was stripped off under reduced pressure. The residue remaining contained 15.7 percent sulfur at a molecular weight of 248. This analysis indicated the following average structure.

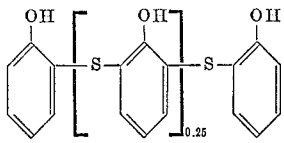

A mixture of 500 grams of this product and 339 grams of cobalt sulfide was heated at about 200 degrees centigrade under about 2500 pounds per square inch of hydrogen in an autoclave. Hydrogen uptake occurred. After the pressure had fallen to about 800 pounds per square inch, the autoclave was vented to release hydrogen sulfide and then pressurized with hydrogen back to about 2500 pounds per square inch. This procedure was repeated four times. The reaction mixture was filtered to remove catalyst and then distilled at 10 millimeters of pressure. About 331 grams of phenol was collected at a temperature of about 77 degrees centigrade through 95 degrees centigrade. This corresponded to yield of 77.5 percent.

EXAMPLE XXIV

A composite of distillation residues of several of the aforementioned hydrogenation runs, 520 grams containing 99.5 grams of sulfur, were heated at 200 degrees centigrade under hydrogenolysis conditions similar to Example XXIII. The phenol obtained, 343 grams corresponded to an 81.5 percent yield.

For purposes of scope of invention, it should be noted the reduction products of phenol sulfides containing more than two phenolic units per chain contain two mercaptan groups. For example, o,o'-dimercaptophenol, as well as o-mercaptophenol, will be produced on reducing o,o'-bis-(o-hydroxyphenylpolythio)phenol.

The above examples and preceding disclosure are not intended to limit this invention except to the extent that necessary limitations are stated and/or included in the appended claims. It is within the scope of this invention to employ equivalents and/or obvious substitutes.

We claim:

1. A process for the preparation of a mixture of phenol sulfides having the formula

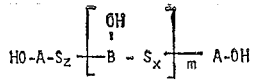

wherein A is independently selected from the group consisting of

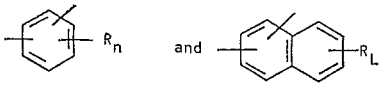

B is independently selected from the groups consisting of

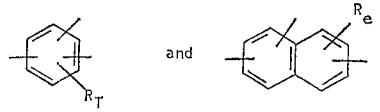

R is independently selected from the groups consisting of: hydrogen; chlorine; bromine; hydroxy; nitro, alkyl of one to twenty carbon atoms; aryl of six to seven carbon atoms, alkyloxy or aryloxy of one to six carbon atoms; $L=0$ to 6; $m$ is a number from 0 to about 3; $n=0$ to 4; $T=0$ to 3; $e=0$ to 5; $z$ and $x$ are numbers from 1 to about 7 provided that the average number of sulfur atoms equal at least about two sulfur atoms per sulfur linkage and provided that at least 60 percent of the sulfur linkages are ortho to one hydroxyl group perphenolic ring, which comprises reacting sulfur with a phenol reagent of the formula:

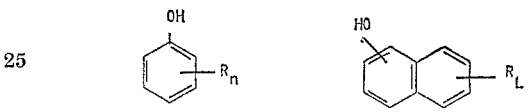

wherein R, $n$ and L have the above defined meanings, and wherein about 0.3 to about 3 moles of phenolic reactant are used per mole of sulfur, at a temperature of about 100 degrees centigrade to about 200 degrees centigrade for a period of about 1 hour to about 30 hours, in the presence of a basic catalyst in a molar amount ranging from at least a catalytic amount up to about 15 percent based on the number of moles of said phenolic reactant, interrupting said reaction before the number of moles of hydrogen sulfide evolved exceeds about 33 percent of the number of moles of sulfur charged into said reaction.

2. A process in accordance with claim 1, wherein the basic catalyst is used in an amount from a catalytic amount to less than 2 percent, the penolic-reactant to sulfur molar ratio is not more than about 2 and the reaction of sulfur with the phenolic reagent is carried out at a temperature of about 140 degrees centigrade to about 180 degrees centigrade.

3. A process in accordance with claim 2 wherein the basic catalyst is used in an amount from a catalyst amount to less than 0.2 percent and at least about 90 percent of the sulfur linkages of the phenol sulfides are ortho to one hydroxyl group per phenolic ring.

4. A process in accordance to claim 3 wherein the reaction is conducted for a period of time from about two to about 15 hours and the reaction is interrupted before the number of moles of hydrogen sulfide evolved exceed about 25 percent of the number of moles of sulfur charged into said reaction.

5. A process in accordance with claim 1, wherein the basic catalyst is used in an amount from about 10 percent to about 15 percent, the phenolic reactant to sulfur ratio is not more than about 2 and the reaction with the phenolic reagent is carried out at a temperature of about 100 degrees to about 150 degrees centigrade.

6. A process in accordance with claim 5 wherein up to 30 percent of the sulfur linkages are para to one hydroxyl group per phenolic ring.

References Cited

UNITED STATES PATENTS 3,494,966  2/1970  Geering et al. _____ 260—608

ALEX MAZEL, Primary Examiner

D. R. PHILLIPS, Assistant Examiner

U.S. Cl. X.R.

260—45.95, 47 UP, 79.5, 469, 516, 775, 609 F